(12) United States Patent
Mirel et al.

(10) Patent No.: US 7,941,297 B2
(45) Date of Patent: May 10, 2011

(54) NOISE MEASUREMENT IN VIDEO IMAGES

(75) Inventors: Ionut Mirel, North York (CA); Edward G. Callway, Toronto (CA); Antonio Rinaldi, Maple (CA)

(73) Assignee: ATI Technologies ULC, Ontario (CA)

( * ) Notice: Subject to any disclaimer, the term of this patent is extended or adjusted under 35 U.S.C. 154(b) by 526 days.

(21) Appl. No.: 12/100,899

(22) Filed: Apr. 10, 2008

(65) Prior Publication Data

US 2009/0259437 A1 Oct. 15, 2009

(51) Int. Cl.
*H03F 1/26* (2006.01)
(52) U.S. Cl. ............ 702/191; 348/241; 348/607; 702/17
(58) Field of Classification Search ............... 702/17, 702/69, 111, 190, 191; 348/241, 607; 345/619; 709/208
See application file for complete search history.

(56) References Cited

U.S. PATENT DOCUMENTS 6,061,100 A * 5/2000 Ward et al. ............... 348/607
2004/0027469 A1* 2/2004 Tsuruoka ................. 348/241

* cited by examiner

*Primary Examiner* — John H Le
(74) *Attorney, Agent, or Firm* — Volpe and Koenig P.C.

(57) ABSTRACT

Methods and apparatus are described for measuring noise in video image processing. The described methods use horizontal and vertical variances of pixels of an image to extract noise information from the image. Silent regions in an image are considered to determine amplitude variations in the image. A smallest silent region in the image is searched by performing measurements over various block sizes. A least sum of absolute differences approach is used on both horizontal and vertical directions for finding the minimum energy of a received image signal. Using the disclosed method and processor, with a Gaussian distribution for the measured channel noise, both silent image regions, as well as edges, are equally covered.

19 Claims, 5 Drawing Sheets

200 OK# NOISE MEASUREMENT IN VIDEO IMAGES

FIELD OF INVENTION

The present invention relates to video image processing.

BACKGROUND

Image processing systems use noise measurement algorithms to measure and filter out noise signals. Image processing techniques, therefore, are usually subject to the noise content of the source image. In order to reduce the effect of noise on the processing, a method for measuring the noise contained by the source is required. Once determined, the measured noise can be subtracted from the image.

Spatial noise is generally the dominant noise in image processing, while temporal noise generally plays a minor part. In particular, the contribution of the pixel structure to the noise power spectrum, which shows up as sharp spikes at spatial frequencies beyond the Nyquist frequency, is important. This type of noise image can make subtle structures invisible or add nonexistent patterns to the image.

Currently, various noise measurement methods are used. Most of these methods though, are either hardware inefficient, dependant on the spatial or temporal pixel motion of the image, or operate in the blanking interval, and are therefore independent of the pixel information. Although, those methods that operate in the blanking interval are robust, they are often unusable due to various signaling methods inserted in the blanking interval, (e.g., teletext, closed caption, etc.).

Therefore, there exists a need for an improved noise measurement method that overcomes the shortcomings of current methods.

SUMMARY

A method and apparatus are disclosed wherein the horizontal and vertical variances of the pixels of an image are determined to calculate a noise measurement in a received image.

DETAILED DESCRIPTION

Although the features and elements are described in particular combinations, each feature or element can be used alone, without the other feature or elements, or in various combinations with or without other features and elements.

A method and processor are disclosed wherein both active horizontal and vertical directions of an image are used for extracting noise information in an image. Both directions are used for noise measurement because Gaussian noise is equally present in the horizontal and vertical directions. In many instances progressive images contain both horizontal and vertical variations. Therefore, accurately measuring the noise in only one direction is very difficult.

Since edge amplitudes are usually larger then noise, the noise components can be hidden. In silent regions, though, the pixel content is usually constant and any amplitude variations are likely to be caused by noise. Therefore, the likelihood of obtaining an accurate measurement is increased if only silent regions in the image are considered. In ideal conditions, (i.e., no noise components), variations of pixel amplitudes in silent regions will be all zero.

The disclosed method, therefore, takes advantage of this by searching for the most silent image region, wherein the integral of all variations in that region can be attributed to the noise energy. The minimum energy in all available silent regions is generally closest to the channel noise. In other words, silent regions are characterized by the least Sum of Absolute Differences (SAD) value. As such, the best candidate for noise measurement is the block with the minimum SAD throughout the entire analyzed image.

The disclosed method and apparatus search for the smallest "silent" region in the image by performing measurements over various block sizes. Hence, even dense images, where flat (silent) regions are extremely small, should be covered by smaller block sizes (e.g., 16×1 or 8×1 or 4×3). The SAD approach is used on both horizontal and vertical directions for finding the minimum energy of a received image signal. Using the disclosed method and processor, with a Gaussian distribution for the measured channel noise, both silent image regions, as well as edges, will be equally covered.

Figure 1:
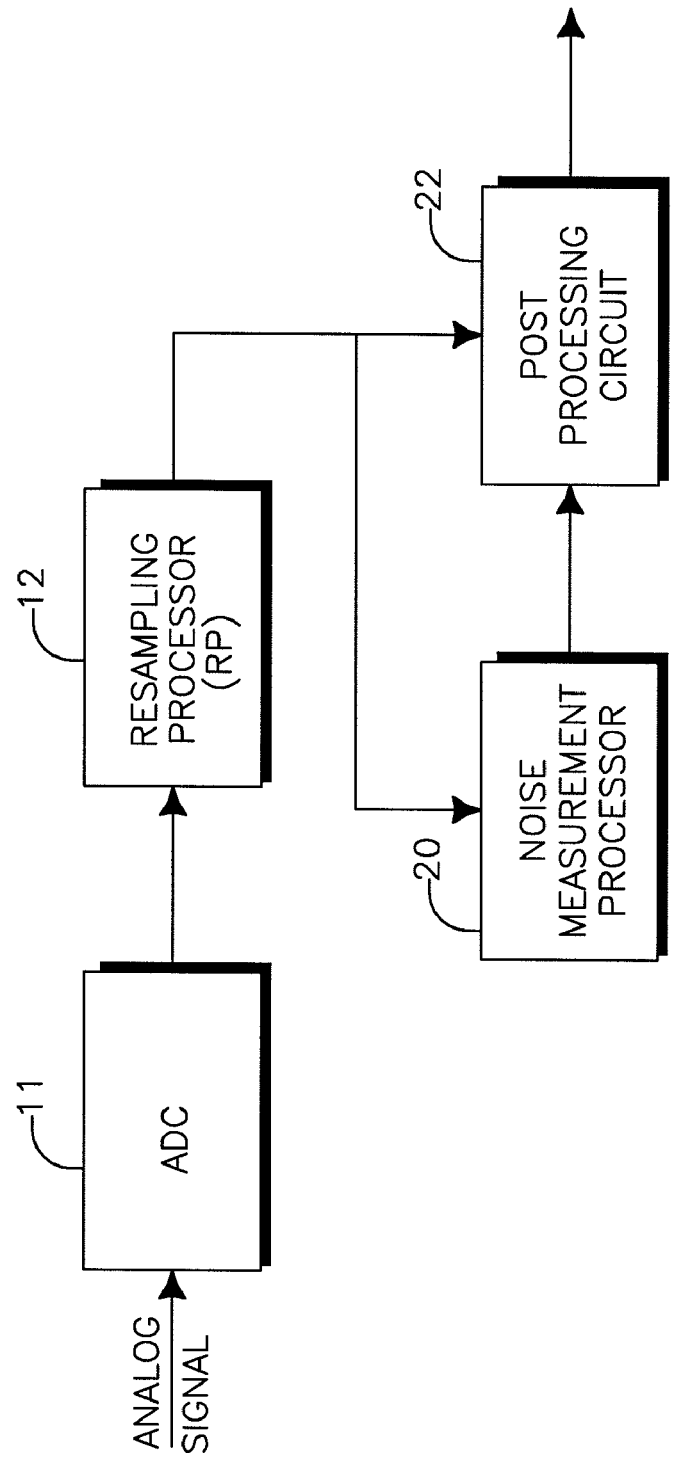
FIG. 1 is a block diagram of a system employing the disclosed method and apparatus for measuring noise in an image.

FIG. 1 is a system 10 that utilizes the disclosed method and apparatus. System 10 comprises an Analog to Digital Converter (ADC) 11, a digital resampling (RP) processor 12, a noise measurement processor 20 and a post processing circuit 22. ADC 11, coupled to RP processor 12, receives video signals for processing. RP processor 12, coupled to ADC 11, noise measurement processor 20 and post processing circuit 22, processes the received video signals and forwards the processed signals to noise measurement processor 20 and post processing circuit 22.

Figure 2A:
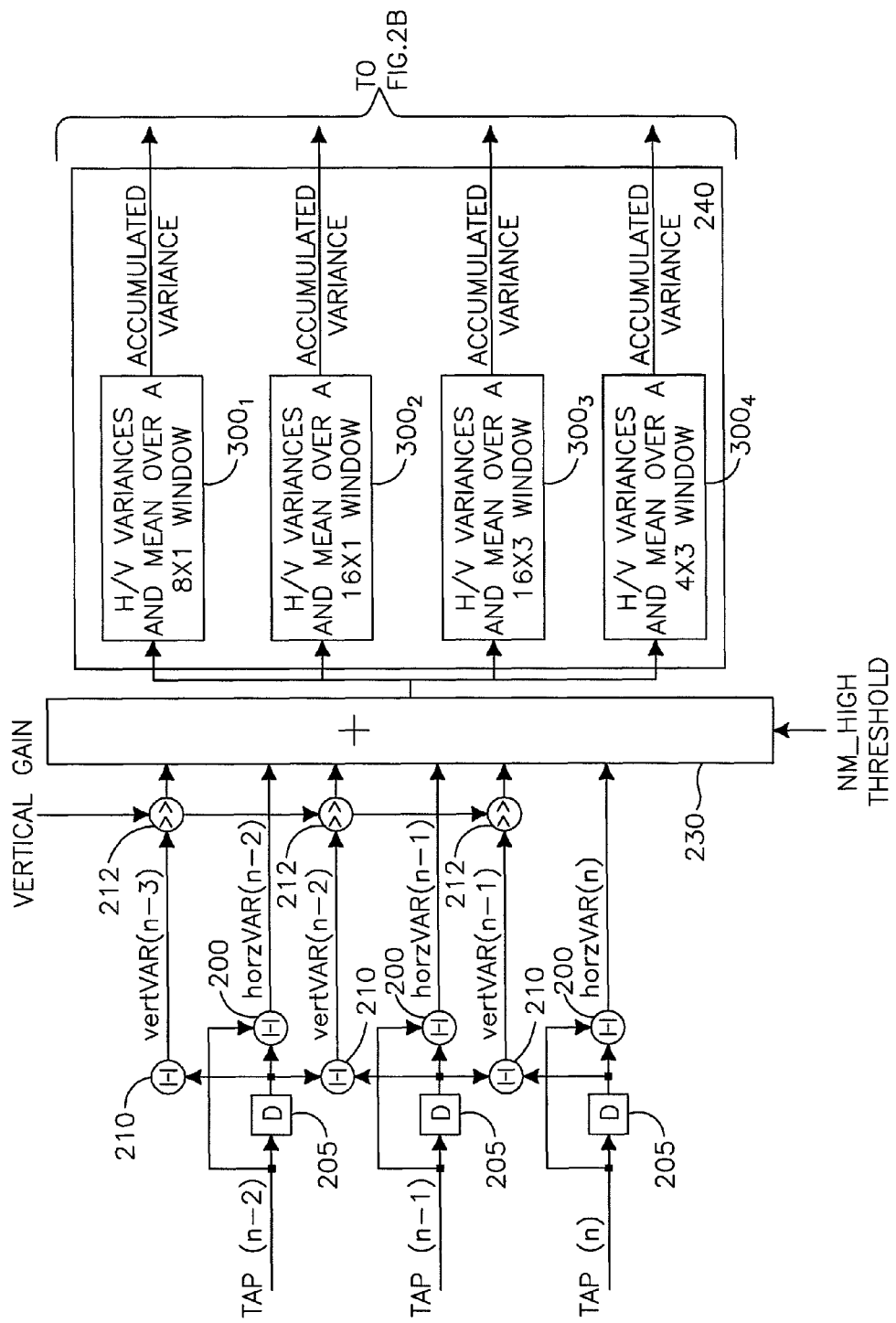
FIGS. 2A and 2B are an example functional block diagram of the disclosed noise measurement processor.
Figure 2B:
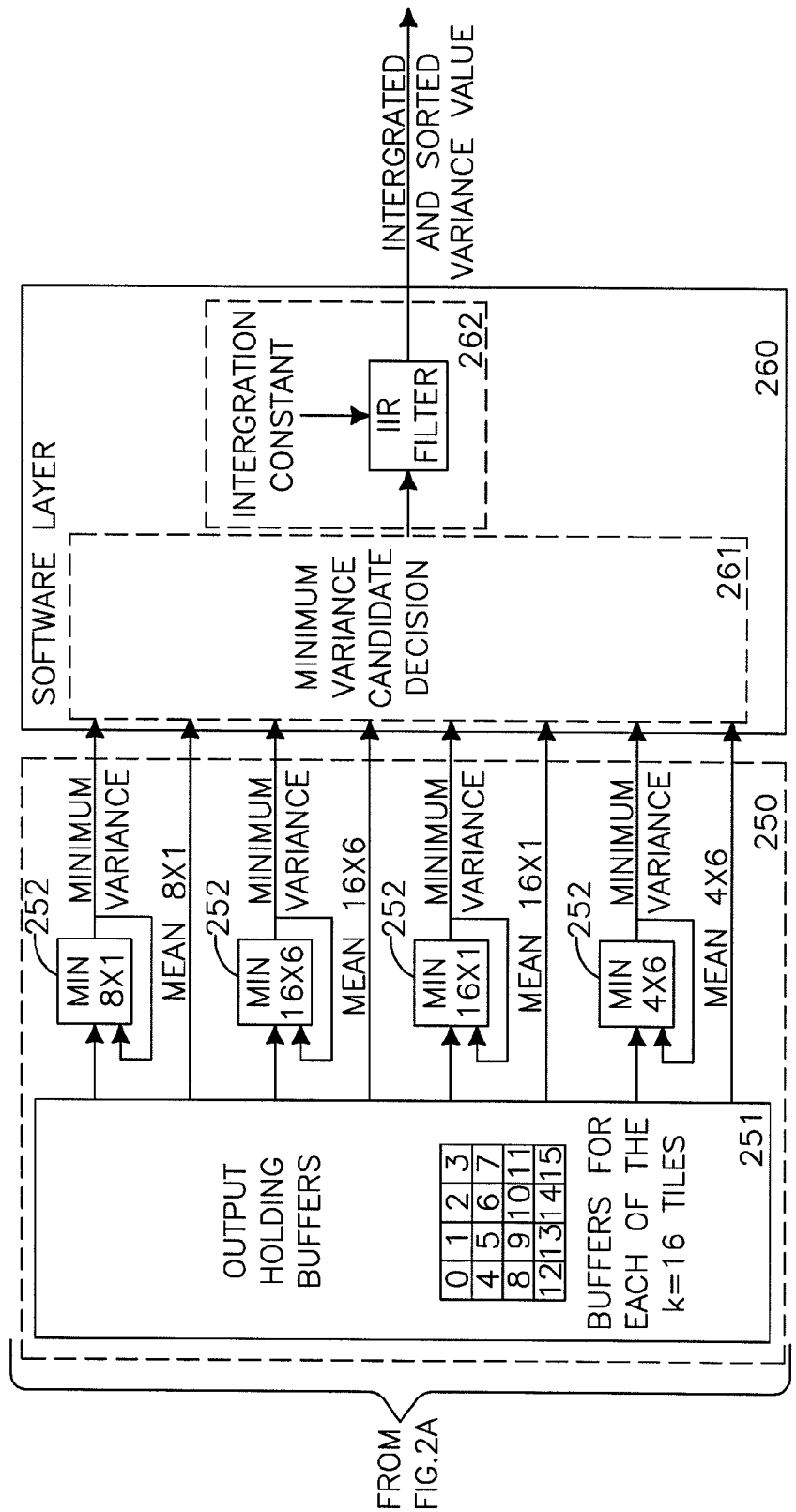

Noise measurement processor 20 receives the processed signals from RP processor 12, and measures and filters the noise present in the signal. The noise measurement is then forwarded to post processing circuit 22 for carrying out video signal processing using the video signal from RP 12 and noise measurement processor 20. A block diagram of an example noise measurement processor 20 implementing the disclosed noise measurement method is illustrated in FIGS. 2A and 2B. The example noise measurement processor 20 shown in FIGS. 2A and 2B uses three (3) lines of pixels in a window.

Referring to FIGS. 2A and 2B, noise measurement processor 20 comprises horizontal processors 200, vertical processors 210, delay elements 205, gain elements 212, a summing device 230, an accumulator 240, a MIN device 250 and a filter 260. Horizontal processor 200, coupled to summing device 230 and delay element 205, receives the signal from RP 12, for example, and a signal from delay element 205. Horizontal processor 200 determines the value of the variance between consecutive pixels in the horizontal direction for each pixel in a pixel row (TAP (n) to TAP (n−2)) of the signal, (preferably the absolute value of the variance), using the processed signal and the delayed signal. The determined variance is then forwarded to summing device 230.

Vertical processor 210, coupled to delay element 205 and gain element 212, receives the signal from delay element 205 and determines the variance between consecutive pixels in the vertical direction. The determined variance is then forwarded to gain element 212. Gain element 212, coupled to vertical processor 210 and summing device 230, applies a gain value VertGain to the determined vertical variance value and forwards this value to summing device 212.

As those having skill in the art know, during scanning, the vertical resolution of the image can be less than the horizontal resolution. Therefore, the contribution of the determined horizontal noise will make a larger contribution to the reported noise measurement than the vertical noise. As such, the vertical gain value, in accordance with the disclosed method, is used to equalize the imbalance of the contributions of the horizontal and vertical noise that results from scanning. Accordingly, as the resolution in the vertical direction decreases compared to the horizontal resolution, the vertical gain value will increase, and vice versa.

The vertical gain, therefore, is a value that preferably represents the vertical contribution that is to be included in the resulting processed image. The vertical contribution is preferably determined using statistics of the measurements from previous image processing. For example, a measurement of the image may be taken of the previous image, for example, a measurement of the horizontal and vertical resolution. Using this image measurement, the vertical gain value can be determined for use by the noise measurement processor 20 for the next (current) image.

Summing device 230, coupled to horizontal processor 200 and gain element 212, receives the determined horizontal and vertical variance values from horizontal processor 200 and gain element 212 and combines the variances that are below a threshold value NM High Threshold and forwards the combined value to Noise Measurement (NM) accumulator 240.

NM accumulator 240, coupled to summing device 230 and MIN device 250, receives the combined values from summing device 230 and accumulates the summed variances over a selected window, to be disclosed below. Accumulator 240 comprises one or more window processors 300$_1$, 300$_2$, 300$_3$, 300$_4$. In the example noise measurement processor 20 illustrated in FIG. 2, accumulator 240 comprises four (4) window processors 300$_1$ . . . 300$_4$. Although four window processors are shown, it should be noted that any number of window processors can be included in accumulator 240. In accordance with the example shown in FIG. 2, window processors 300$_1$ . . . 300$_4$ are 8×1, 16×1, 16×3 and 4×3 window processors, respectively. A 16×1 window processor 300$_2$ accumulates the combined horizontal and vertical variances from summer 230 over a 16×1 pixel window. Window processor 300$_2$ also calculates the horizontal mean over the same window size. In accordance with the shown example, the summed variances are accumulated over 16, 8 and 4 consecutive pixels to give the 8×1, 16×1, 16×3 and 4×3 accumulated variances output by the respective window processors 300$_1$, 300$_2$, 300$_3$, 300$_4$. Each window processor 300$_1$, 300$_2$, 300$_3$, 300$_4$ (8×1, 16×1, 16×3 and 4×3) outputs the four smallest accumulated variances (noise measurement) and the local pixel mean over its respective window size when the accumulated variance measurement was made. Additionally, each sub-region returns the mean of the accumulated variances.

In accordance with this method, the purpose of the mean calculation relates the noise values to the actual pixel level. For this reason, the image region corresponding to the smallest inter-window correlated noise measurement (i.e., the smallest accumulated variance) is stored with the window's corresponding mean value. For pixels in the analyzed block with high(er) brightness levels, the mean calculation will yield high values. The measurement result will be reduced in such regions since the visual impact of noise on bright scenes is less visible. However, for small(er) mean values (i.e. dark scenes)—where the visual impact of noise is more visible than within bright areas, the mean calculation will yield lower values.

Figure 3:
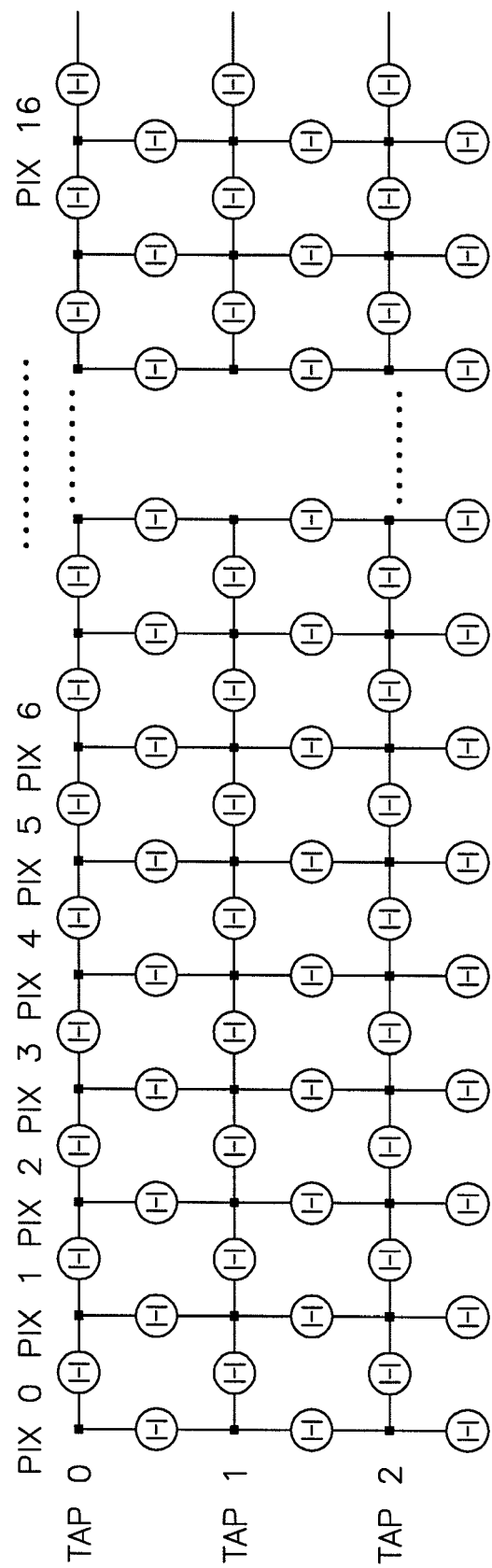
FIG. 3 illustrates an example sliding window used for noise measurement.

FIG. 3 shows an example pixel grid used to perform the variance calculation. As indicated above, variances are calculated for consecutive horizontal and vertical pixels, thus covering both processing directions. In accordance with the example noise measurement processor 20 shown in FIG. 2, the result of the calculation is accumulated over 16, 8 and 4 valid grid positions, hence operating as a running average.

Illustrated in FIG. 3, the pixel grid includes sixteen (16) pixels in the horizontal direction and three (3) lines of pixels in the vertical direction of an input image from RP 12. In accordance with this example, accumulator 240 accumulates the pixel variances over sixteen (16) pixels from three (3) consecutive lines. As such, accumulator 240 conducts an accumulation of 15×3 variances generating the sum of weighted spatial and temporal values that have to be continuously averaged throughout the entire selected measurement image. In order to reduce the computational complexity to determine this value, the disclosed method uses Sum of Absolute Difference (SAD) as energy measure for the 16×3 region of interest. The Sum of Square Differences (SSD) may also be used.

Although SSD offers a squared based calculation (i.e., energy), and therefore is a more accurate measure of the energy contained in an image block, it is more computationally expensive and complex than SAD. The relative error between SSD and SAD, though is negligible for the purpose of noise measurement. The SAD is computed using the following equation:

$$\text{SAD}(\Delta_X, \Delta_Y) = \sum_{Subwindow} \left| \sum_{Blocksize} P_{(m,n)} - \sum_{Blocksize} P_{(m+1,n+1)} \right| \quad \text{Equation (1)}$$

The "Subwindow" term in (1) represents the actual active subwindow on which the measurement is preformed; and "BlockSize" is preferably chosen to be twice the native MPEG block size: (e.g., 2*8Tap=16 pixels). Since large variations in the signal usually mask the noise level, such variations are discarded from the running average. Only variances below a threshold level are accumulated as per Equation 1.

It should be noted that the windows (sub-regions) may be designed to cover different size windows. In the example shown in FIG. 2, the windows have been selected to provide a narrowed down approach such that the edges of images are detected. As those having skill in the art would understand, a single window of 16 pixels is too large to accurately determine an edge. Therefore, the disclosed method provides for one or more smaller windows to assist in edge detection. Although, the four windows disclosed are over 16, 8 and 4 pixels, these sizes are only an example and a window can be larger or smaller than these.

The resulting four (4) minimum variances from each window processor 300 of accumulator 240 are forward to MIN device 250. MIN device 250, coupled to accumulator 240 and filter 260, comprises a buffer 251 and one or more MIN window determiners 252. In accordance with the disclosed method, each of the accumulated variances are temporarily stored in buffer 251 in order to align the spatial positions of each accumulated variance.

The minimum variances in buffer 251 are then compared to determine the minimum variance for each window by MIN window determiner 252, (i.e., searching the minimums for the minimum). MIN processor 250 concentrates the noise measurement on local noise level, thereby disregarding all large values which generally relate to details in the image.

Filter 260, coupled to MIN processor 250, comprises a selector 261 and an IIR filter 262. Selector 261 receives the minimum variance values for each window processor, four (4) in the example of FIG. 2, and selects the best candidate out of the windows. This value is then forwarded to IIR filter 262. IIR filter 262, preferably an IIR Low Pass filter structure, filters the minimum noise value received from selector 261 and generates an integrated noise value, the low varying component of the noise measurement, which is forwarded to post processing circuit 22, such as edge enhancement circuitry.

Figure 4:
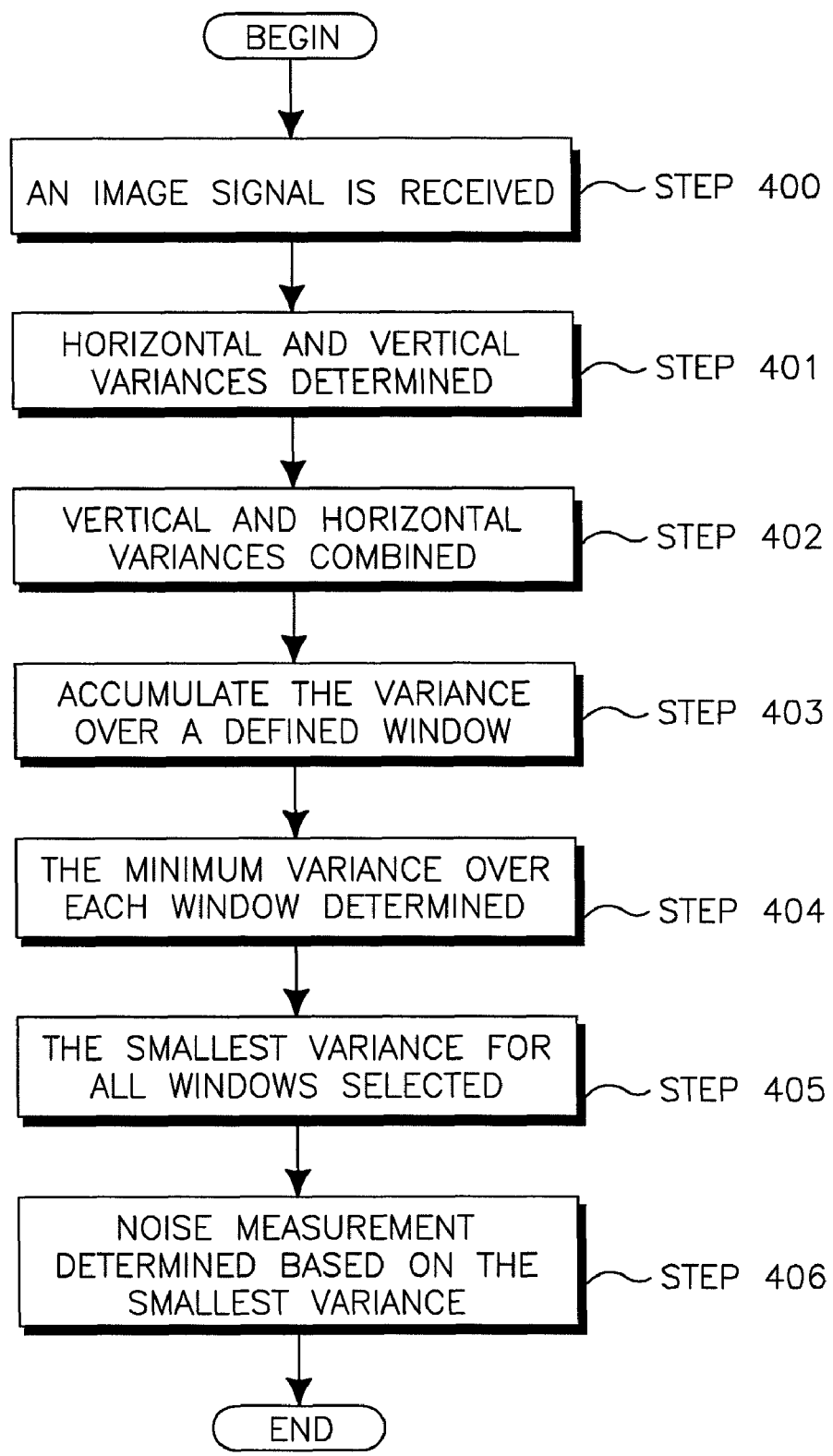
FIG. 4 illustrates an example flow diagram of the disclosed method of measuring noise in a received image.

The disclosed method of noise measurement is illustrated in the flow diagram of FIG. 4. An image signal is received by noise measurement processor 20, (step 400). The horizontal and vertical variance of each pixel in the image signal are determined, (step 401). The vertical variance is multiplied by a gain and the result summed with the horizontal variance, (step 402). This combined variance is accumulated over a certain number of pixels for each of a plurality of pixel windows and a horizontal mean variance also determined for each pixel window, (step 403).

The accumulated variances and horizontal mean for each pixel window are used to determine the minimum variance for each of the pixel windows, (step 404). The minimum variances for each pixel window are compared and the least of these variances is selected, (step 405) and used for the determination of the noise measurement, (step 406).

The disclosed method and noise measurement processor 20 can be extended to interlaced scan format noise measurement. In this case, the reported noise value will be about half the value measured for the same block size applied on progressive images. As those having skill in the art know, the spatial distance between lines in an image is about half that of progressive images. Therefore, the reported noise value is about half the value of the noise measurement for the same block size applied on progressive images.

The disclosed method may be implemented on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s).

What is claimed is:

1. A method for processing a video image signal represented by a plurality of lines of consecutive pixels comprising:
   determining a horizontal variance between consecutive pixels in the plurality of consecutive lines in conjunction with determining a vertical variance between corresponding pixels in at least two of the plurality of consecutive lines of the signal;
   accumulating the horizontal and vertical variances over at least one pixel window that includes horizontal variances of consecutive pixels of a line and vertical variances between corresponding pixels of the line and a consecutive line; and
   determining a noise measurement based on a smallest variance determined from the accumulated variances.

2. The method of claim 1 wherein the accumulating of the horizontal and vertical variances is performed over a plurality of differently sized pixel windows.

3. The method of claim 1 further comprising, in each pixel window, determining a mean of the accumulated variances.

4. The method of claim 3 further comprising determining the minimum accumulated variance for each of the pixel windows.

5. The method of claim 1 further comprising multiplying each vertical variance by a vertical gain.

6. The method of claim 5 further comprising summing the horizontal and vertical variances.

7. The method of claim 6, wherein the summed variance are accumulated over four pixel windows.

8. The method of claim 7, wherein the fours pixel windows are 16×3, 4×3, 16×1 and 8×1, respectively.

9. The method of claim 8, wherein the smaller windows are used for detecting edges within the image.

10. The method of claim 5, wherein the vertical gain adjusts the vertical contribution included in the resulting processed image.

11. A processor for processing a video image signal represented by a plurality of lines of consecutive pixels comprising:
    a horizontal processor for determining a horizontal variance between consecutive pixels in a plurality of consecutive lines;
    a vertical processor for determining a vertical variance between corresponding pixels in at least two of the plurality of consecutive lines of the signal;
    an accumulator for accumulating the horizontal and vertical variances over at least one pixel window that includes horizontal variances of consecutive pixels of a line and vertical variances between corresponding pixels of the line and a consecutive line; and
    a filter for determining a noise measurement based on a smallest variance out of the accumulated variances.

12. The processor of claim 11 wherein the accumulating of the horizontal and vertical variances is performed over a plurality of differently sized pixel windows.

13. The processor of claim 12, wherein the accumulator determines a mean of the accumulated variances.

14. The processor of claim 11, further comprising a gain element for multiplying each vertical variance by a vertical gain.

15. The processor of claim 14, further comprising a summer for combining the horizontal and vertical variances.

16. The processor of claim 15, wherein the combined variances are accumulated over four (4) different sized pixel windows.

17. The processor of claim 16, wherein the fours pixel windows are 16×3, 4×3, 16×1 and 8×1, respectively.

18. The processor of claim 14, wherein the vertical gain adjusts the vertical contribution included in the resulting processed image.

19. The processor of claim 11, wherein the filter comprises an infinite impulse response filter for generating an integrated noise value.

* * * * *